No. 616,173. Patented Dec. 20, 1898.
F. A. WING.
BUTTON SEWING MACHINE.
(Application filed Mar. 5, 1892. Renewed May 11, 1898.)
(No Model.) 7 Sheets—Sheet 1.

Witnesses
Frank E. Greenwood
A. M. Dolloff

Inventor
Frank A. Wing
by Henry Chadbourne
his Atty.

No. 616,173. Patented Dec. 20, 1898.
F. A. WING.
BUTTON SEWING MACHINE.
(Application filed Mar. 5, 1892. Renewed May 11, 1898.)

(No Model.) 7 Sheets—Sheet 2.

Witnesses
Frank E. Greenwood
A. M. Dolloff

Inventor
Frank A. Wing
by Henry Chadbourn
his Atty.

No. 616,173. Patented Dec. 20, 1898.
F. A. WING.
BUTTON SEWING MACHINE.
(Application filed Mar. 5, 1892. Renewed May 11, 1898.)
(No Model.) 7 Sheets—Sheet 4.

Witnesses
Frank E. Greenwood
A. M. Dolloff

Inventor
Frank A. Wing
by Henry Chadbourn
his atty.

No. 616,173. Patented Dec. 20, 1898.
F. A. WING.
BUTTON SEWING MACHINE.
(Application filed Mar. 5, 1892. Renewed May 11, 1898.)
(No Model.) 7 Sheets—Sheet 5.

Witnesses
D. E. Hempster
Anna M. Dolloff

Inventor
Frank A. Wing,
by
Henry Chadbourn,
his Atty.

THE NORRIS PETERS CO., PHOTO-LITHO., WASHINGTON, D. C.

UNITED STATES PATENT OFFICE.

FRANK A. WING, OF SOMERVILLE, MASSACHUSETTS, ASSIGNOR TO THE WING BUTTON SEWING MACHINE COMPANY, OF BOSTON, MASSACHUSETTS.

BUTTON-SEWING MACHINE.

SPECIFICATION forming part of Letters Patent No. 616,173, dated December 20, 1898.

Application filed March 5, 1892. Renewed May 11, 1898. Serial No. 681,039. (No model.)

*To all whom it may concern:*

Be it known that I, FRANK A. WING, a citizen of the United States, residing at Somerville, in the county of Middlesex and State of Massachusetts, have invented certain new and useful Improvements in Button-Sewing Machines; and I do hereby declare the following to be a full, clear, and exact description of the invention, such as will enable others skilled in the art to which it appertains to make and use the same, reference being had to the accompanying drawings, forming a part of this specification.

This invention relates to improvements in button-sewing machines or in machines used to sew buttons to clothing or to other articles; and it has for its object to produce a machine which can be run more rapidly, producing more and better work than machines now in common use for the same purpose.

The invention consists of a button clamping or holding device composed of two pivoted jaws having novel mechanism whereby they are quickly and accurately adjusted in unison with the holding-jaws, so that the centers of all buttons held in the button-holding device will occupy the same place no matter how they may vary in size.

It further consists in the employment of novel means whereby the button-holder, with the button held therein, is automatically and intermittingly reciprocated to form stitches through a two-eyed button; also, in combination with the stitch-forming mechanism of the machine, a button-holder moving in straight lines, being automatically and intermittingly reciprocated, then automatically shipped in a line at right angles to the line of its reciprocation, and then again automatically and intermittingly reciprocated in a straight line parallel to the line of its first reciprocation in order to form stitches in a four-eyed button.

It further consists in novel mechanism to adjust the amount of reciprocation of the button-holder as well as the distance it is shipped to compensate for variations in the distances between the eyes of different buttons.

The invention consists also in the employment of novelties in the starting mechanism and in the device whereby the machine is automatically stopped and locked after it has formed a predetermined number of stitches and attached the button; also, in minor details of construction and combinations of elements, as will be fully described hereinafter and claimed.

Referring to the accompanying drawings, which illustrate my invention and form an essential part of this specification.

Similar letters refer to similar parts on the different parts of the drawings.

The stitch-forming mechanism used in the machine forms no part of my present invention, as my improvements may to equal advantage be applied to many of the various and well-known sewing-machines now in common use simply by the use of mechanical skill alone. I prefer, however, to use the stitch-forming mechanism of the machine known as the "Wheeler & Wilson No. 12" or "D 12," and I have shown such on the drawings.

$a$ represents the bed-plate; $a'$, the shuttle-driving shaft; $a^2$, the shuttle; $b$, the bracket-arm; $b'$, the main driving-shaft; $b^2$, the needle-bar; $b^3$, the take-up, and $b^4$ the slack-thread controller, as usual of the Wheeler & Wilson machine above mentioned. When in use, the machine is adapted to be mounted upon a stand $c$ in the usual manner.

Upon the main driving-shaft is loosely mounted the driving-pulley $b^5$, which has a longitudinal movement on said shaft and is provided with a grooved hub for the reception of a ring $b^6$, having trunnions on two opposite sides, which ring fits loosely within said groove. A bell-crank lever $c'$, fulcrumed at $c^2$ to the stand $c$ or to any other stationary part of the machine, is attached at one end to a suitable treadle (not shown on the drawings) by means of a chain or rod $c^3$ and has its opposite or free end resting against the lower end of the lever $c^4$, fulcrumed at $c^5$ to the frame of the machine, the latter lever being forked in its upper end and pivoted to the trunnions on the ring $b^6$. Thus it will be seen that a downward pull on the chain $c^3$ will cause the driving-pulley to move longitudinally on the driving-shaft outward from the frame of the machine. It is not essential that the mechanism for operating the longitudinally-movable driving-pulley should be exactly as that shown on the drawings, as other and well-known equivalent devices might be used to equal advantage. A lug $b^7$, (shown in Figs. 9 and 10,) projecting from the outer face of the driving-pulley, comes in contact with an arm $b^8$, rigidly attached to and projecting from the main driving-shaft. When said pulley is moved outward, as above described, and as the pulley is kept in a continuous motion in the direction of the arrow shown in Fig. 9, it causes a similar movement to be imparted to the main driving-shaft, which starts the machine. The rotary motion of the driving-shaft imparts a corresponding motion to the shuttle-driving shaft $a'$ through the connecting rods $a^3 a^3$ and the double cranks on the shuttle-driving shaft and main driving-shaft.

Figure 15:
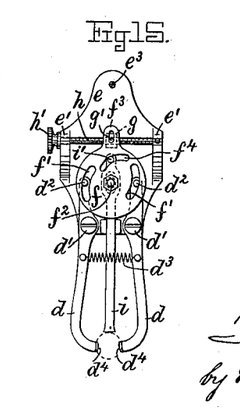
Fig. 15 represents a detail bottom view of the button holding and gaging device.
Figure 16:
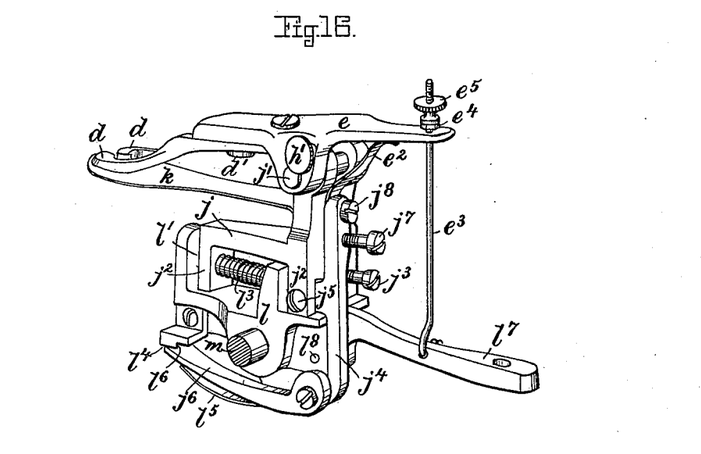
Fig. 16 represents a perspective view of the button-holding device and a portion of the mechanism which carries it and by which it is operated.
Figure 17:
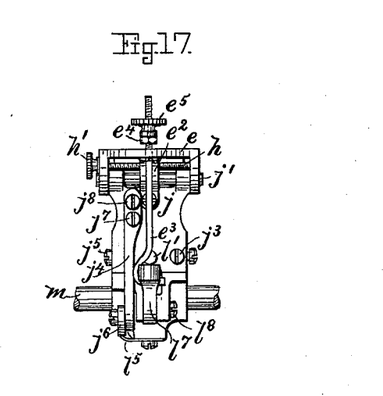
Fig. 17 represents a rear view of the same.
Figure 18:
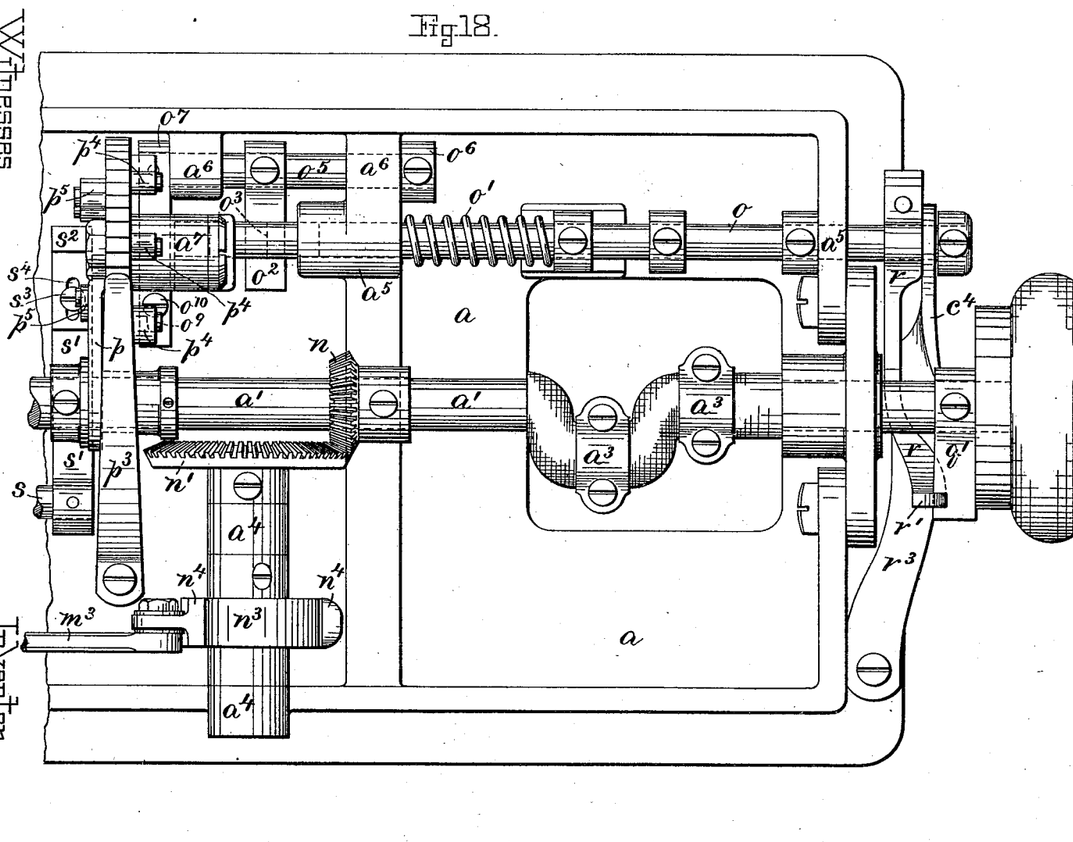
Fig. 18 represents a part of a bottom view of the machine on an enlarged scale from that shown in Fig. 2.
Figure 19:
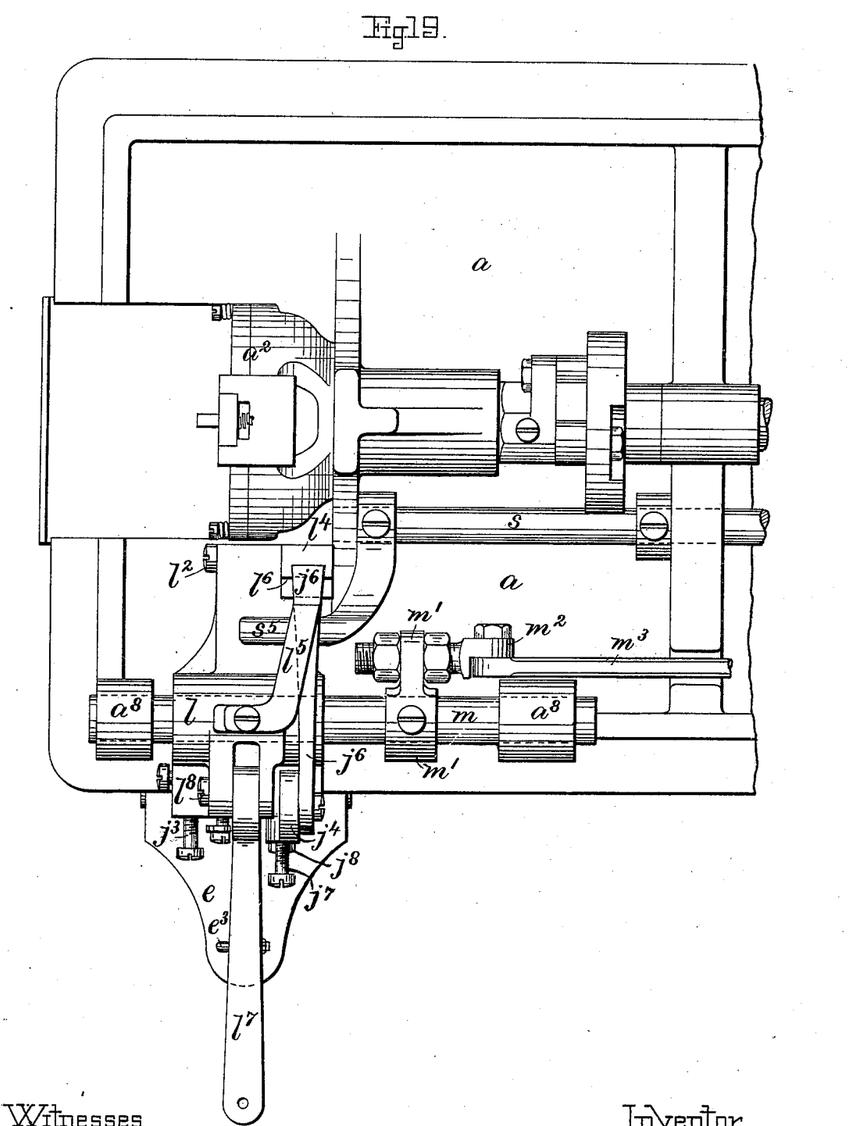
Fig. 19 represents a bottom view of the remaining part of the machine not shown in the preceding figure and showing the same on a correspondingly-enlarged scale.

The mechanism for clamping and holding the button while it is being sewed to the material is carried out as follows:

Two jaws $d\, d$ are pivoted at $d'\, d'$ to the under side of the plate $e$ and are provided on their inner ends with the pins $d^2\, d^2$, which move within cam-shaped slots $f'\, f'$, formed in the cam-disk $f$. The pins $d^2\, d^2$ are held against the outer surface of the cam-slots with a yielding pressure by means of the spring $d^3$, which is attached to the forward end of the jaws, as shown in Fig. 15. The forward end of the clamping-jaws are so grooved as to form lips $d^4\, d^4$, which rest upon the top of the button held thereby and prevent the button from being drawn upward from the jaws when the needle is withdrawn from the eye of the button. The cam-disk $f$ is pivoted at $f^2$ to the plate $e$ and is provided with the extension $f^3$ at the rear, which extension is provided with the slot $f^4$, within which a pin $g'$ on the nut $g$ slides. The nut $g$ is mounted upon a screw-threaded spindle $h$, which is adapted to be turned in the bearings $e'\, e'$ on the plate $e$ by means of the thumb-nut $h'$, as shown in Fig. 15, or by other and well-known mechanical equivalents. Thus it will be seen that if the thumb-nut $h'$ is turned it will cause the nut $g$ to move upon the spindle $h$ and by its connection to the cam-disk $f$ will cause said disk to turn upon its fulcrum and spread or contract the jaws $d\, d$ by means of the cam-slots $f'\, f'$ and pin $d^2\, d^2$, according to the direction in which the thumb-nut is turned. This allows of the adjustment of the jaws to hold various sizes of buttons and dispenses with the necessity of using different clamps for different sizes, as is the case when stationary jaws are used. The cam-slots $f'\, f'$ are preferably made wider than the diameter of the pins $d^2\, d^2$, so as to allow the jaws to expand slightly against the influence of the spring $d^3$ when the button is inserted between them in order to have the jaws press against the button to hold it firmly. This yielding of the jaws allows of a slight variation in the diameter of the button used without the necessity of adjusting the cam-disk. The cam-disk $f$ is also provided with a cam-slot $f^4$, within which a pin $i'$ on the gage-bar $i$ moves when the cam-disk is turned on its fulcrum. The cam-slot $f^4$ is so formed that any movement of the cam-disk on its fulcrum will move the gage-bar backward or forward a distance equal to the distance that each of the jaws $d\, d$ is expanded or contracted by the same movement of the cam-disk. This automatic adjusting of the gage-bar so gages the buttons that their centers will occupy the same place in the holder no matter how they may vary in size.

I do not wish to confine myself to the particular mechanism shown and described for automatically operating the gage-bar in connection with the button-holding jaws nor to the exact mechanism for operating said jaws, as the same may be varied at will within the scope of mechanical skill without departing from the spirit of this part of my invention.

By the use of the gage as above described the liability of breaking the needle caused by not having the eye of the button come in its proper place under the needle when being sewed is done away with.

The plate $e$, to which is attached the button clamping or holding device, is fulcrumed at $j'$ to the bracket $j$. This bracket has bearings $j^2 j^2$ on the shaft $l'$, upon which it is longitudinally movable in a line at right angles to the center line of the shuttle-driving shaft. The shaft $l'$ is mounted in the block or carriage $l$ and is held rigidly by means of the set-screw $l^2$, as shown in Fig. 7.

The block or carriage $l$ is rigidly mounted upon the shaft $m$, which is longitudinally reciprocated within the bearings $a^8 a^8$, projecting from the under side of the bed-plate. The shaft $m$ and its connections are prevented from rocking within the bearings $a^8 a^8$ by means of the bracket $j$, bearing against the under side of the bed-plate.

Figures 7, 8, 9, 10, 11:
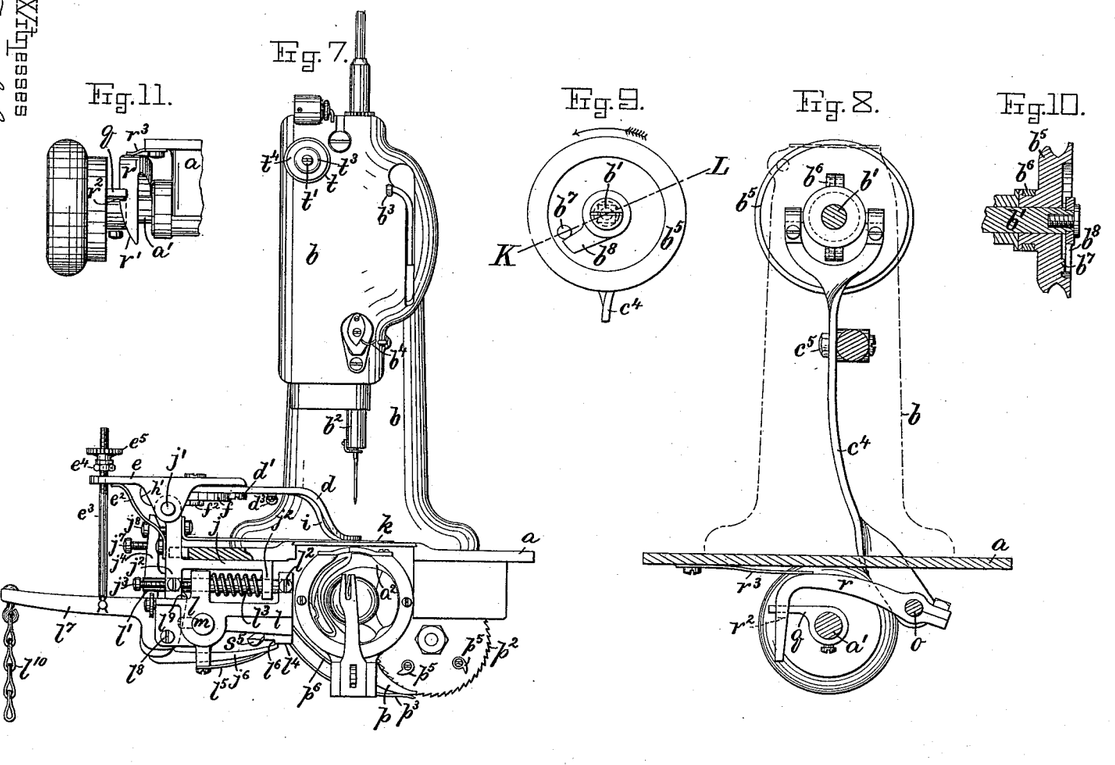
Fig. 7 represents a side elevation of the machine as seen from X on Fig. 1.
Fig. 8 represents a vertical cross-section on the line I J, shown on Figs. 1 and 2.
Fig. 9 represents a face view of the clutch on the main driving-shaft for imparting motion to the machine from the driving-pulley.
Fig. 10 represents a longitudinal section on the line K L, shown on Fig. 9.
Fig. 11 represents a detailed view of a portion of the locking mechanism for the machine.
Figure 12:
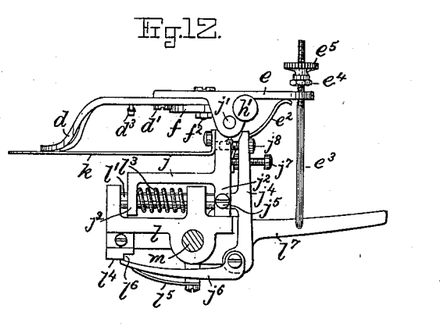
Figs. 12 and 13 represent detailed vertical sections respectively on the lines M N and O P, shown in Fig. 2, showing the button-holding device and a portion of the mechanism which carries it and by which it is operated.
Figure 13:
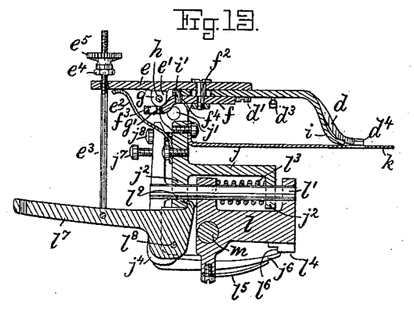
Figure 14:
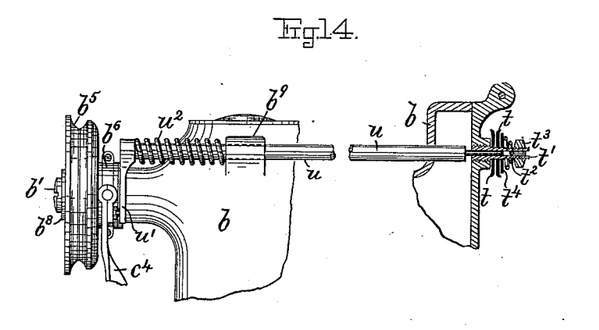
Fig. 14 represents a detailed view of the mechanism for automatically releasing the tension on the upper thread when the machine has finished sewing on a button.

A spring $l^3$, interposed between the bracket $j$ and the block or carriage $l$, tends to force the bracket and its attached button-holding device forward until the screw $j^3$, which passes through a screw-threaded perforation in the rear bearing $j^2$ on the bracket, comes in contact with the block, as shown in Figs. 7 and 12. The set-screw $j^3$ may be adjusted so as to allow the spring $l^3$ to force the bracket forward more or less, as desired, for a purpose hereinafter set forth.

A lever $j^4$ is pivoted at $j^5$ to the bracket $j$, as shown in Fig. 12, to the lower end of which lever is pivoted the pawl $j^6$, the free end thereof being held against the surface $l^4$ on the under side of the block or carriage $l$ by means of the spring $l^5$. The surface $l^4$ is provided with a ledge $l^6$, as shown, against which the end of the pawl $j^6$ rests when the bracket is forced backward a given distance against the influence of the spring $l^3$ in order to lock the bracket in its rear position. The distance necessary to move the bracket backward in order to have the end of the pawl lock the same is adjusted by means of the screw $j^7$, which passes through a screw-threaded perforation in the end of the lever $j^4$ and presses against the bracket $j$, forcing the end of the pawl forward on the surface $l^4$, and it is also adjusted by means of the screw $j^8$, which passes through a perforation in the end of the lever $j^4$ and is screwed into a screw-threaded recess in the bracket, drawing the end of the pawl backward on the surface $l^4$. The screws $j^7$ and $j^8$ firmly hold the lever $j^4$ in its adjusted position. Thus it will be seen that the forward movement of the bracket may be adjusted by means of the screw $j^3$, and the amount of backward movement required to lock the bracket may be adjusted by means of the screws $j^7$ and $j^8$.

A lever $l^7$, pivoted at $l^8$ to the block or carriage $l$, is provided with the upward projection or tooth $l^9$, which rests against the front of the bearing $j^2$ on the bracket $j$, being connected at its rear end by means of the chain or rod $l^{10}$ to a suitable treadle. (Not shown on the drawings.)

A rod $e^3$ is so pivoted to the rear part of the lever $l^7$ as to be easily disconnected therefrom and has its upper end projecting through a perforation in the rear of the plate $e$, where it is provided with a screw-thread and the nut $e^4$ and check-nut $e^5$. This nut and check-nut are so adjusted upon the rod as to allow the lever to be pulled downward and the rod to move through the perforation in the plate $e$ a certain distance without bringing the nut into contact with said plate. This movement causes the bracket to move backward until the pawl $j^6$ has passed by the ledge $l^6$ on the surface $l^4$ and insured the locking of the bracket in its rear position; but if the lever $l^7$ is continued to be pulled downward it will cause the nut $e^4$ to come in contact with the upper surface of the plate $e$ and to turn said plate with the button-holding jaws $d$ $d$ attached thereto, so as to raise said jaws up from their normal position against the influence of the spring $e^2$ in order to place the work upon the cloth-plate $k$ or to remove it therefrom, and also in order to place a button within said jaws.

Upon the shuttle-driving shaft is firmly mounted the beveled pinion $n$, which meshes into the beveled gear $n'$, rigidly attached to the shaft $n^2$, the number of teeth on the gear being the necessary multiple of the number of teeth on the pinion to cause the needle to produce the required number of stitches in each eye of the button before the next eye to be sewed through is moved under the needle, as will be fully described hereinafter. The shaft $n^2$ is provided with bearings $a^4 a^4$, which project from the under side of the bed-plate and in which the shaft rotates.

A cam $n^3$ is firmly mounted upon and rotates with the shaft $n^2$, which cam operates upon a bifurcated lever $n^4$ to intermittingly oscillate said lever upon its fulcrum $n^5$. An arm $m'$ is rigidly attached to the longitudinally-reciprocating shaft $m$, which arm is provided with a perforation, through which is inserted the screw-threaded bolt $m^2$, provided with nuts, one on each side of said arm, to allow of the adjustment of the bolt within the perforation within the arm. A connecting-rod $m^3$ is pivotally connected at one end to the bolt $m^2$ and at the opposite end, by means of the bolt $m^4$ and slot $m^5$, is adjustably connected to the lever $n^4$. Thus it will be seen that a rotary movement of the shuttle-driving shaft will cause an intermittingly-reciprocating movement of the shaft $m$ within its bearings, and through the connection of said shaft with the button-holding jaws will intermittingly reciprocate said jaws and button held thereby under the needle, so as to form stitches through two of the eyes of the button.

By attaching the connecting-rod $m^3$ adjustably to the bifurcated lever $n^4$ I am able to adjust the amount of reciprocation imparted to the shaft $m$ by the action of the cam $n^3$, and consequently to adjust the amount of the reciprocating movement of the button-holding device, which is connected to said shaft. Thus the button-holding device is made adjustable to compensate for the variations in the distances between the eyes of the various buttons to be sewed on the machine.

The adjustment of the connection between the connecting-rod $m^3$ and the arm $m'$, attached to the shaft $m$, adjusts the button-holding device in a line with the line of the reciprocating movement of said device, and thus I am able to adjust the button-holding device so that the needle will occupy a position directly above the center of the button held in said device when the bifurcated lever is in the center of its oscillating movement.

One stitch only is formed by a rotation of the shuttle-driving shaft, and the button-holding jaws are intermittingly reciprocated forward and back once only by a complete rotation of the shaft $n^2$. Now if the gear $n'$ contains twice the number of teeth that are on the pinion $n$ and the cam $n^3$ is properly formed a stitch will be made in one of the eyes of the button. The button then moves while the needle is in its upper position in order to present the other eye to the needle. A stitch will be formed through this second eye and the button moved back to its former position; but should the number of teeth on the gear be increased to four times the number of teeth that are on the pinion and the cam $n^3$ properly formed two stitches may be made in one eye of the button, the button then moved, and two stitches be made in the second eye, and the button moved to its original position. By forming two stitches in each eye of the button, between the reciprocating movement of the same, as above described, each stitch made across the body of the button will be fastened off or locked, and thus prevent the button from unsewing should one of the stitches be broken. The cam $n^3$ is so formed as to move the button-holding jaws during the time that the needle is above and out of the work.

I do not wish to limit myself to the exact connecting mechanism as shown between the shafts $n^2$ and $m$ to produce an intermittingly-reciprocating movement of the latter shaft, as the same may be varied within the scope of mechanical skill without departing from the spirit of this part of my invention.

Figure 1:
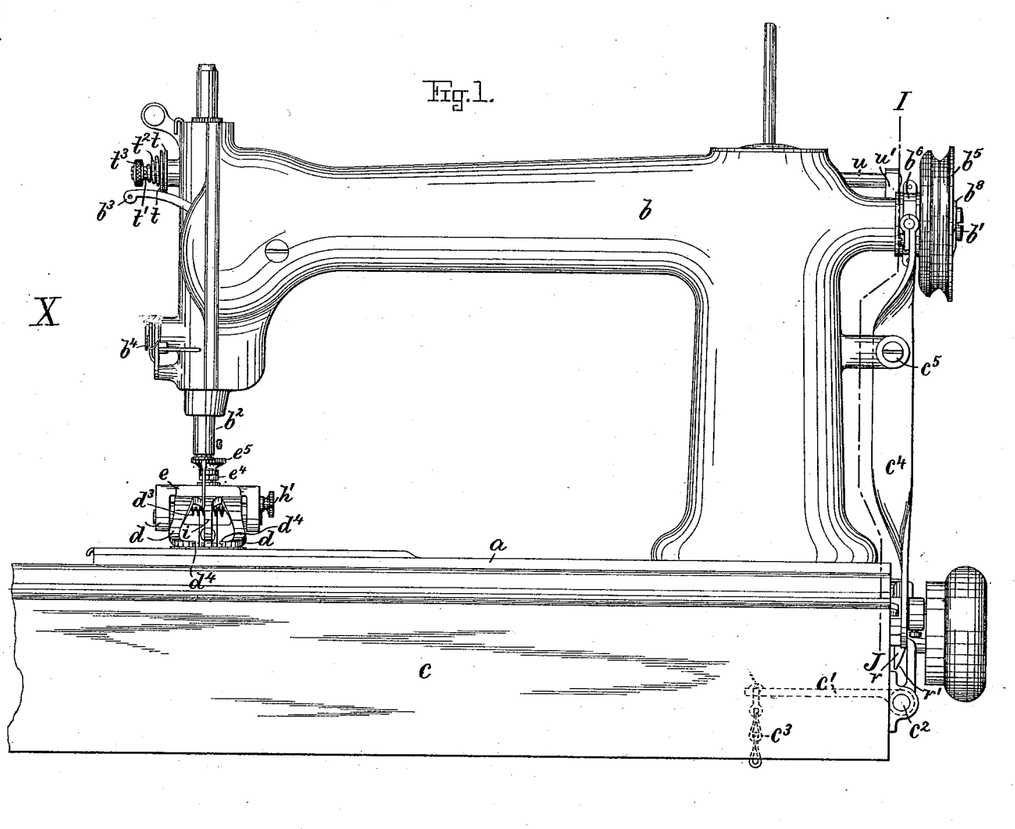
Figure 1 represents a front elevation of my improved machine, showing a portion of the top of the stand upon which it is mounted.
Figure 2:
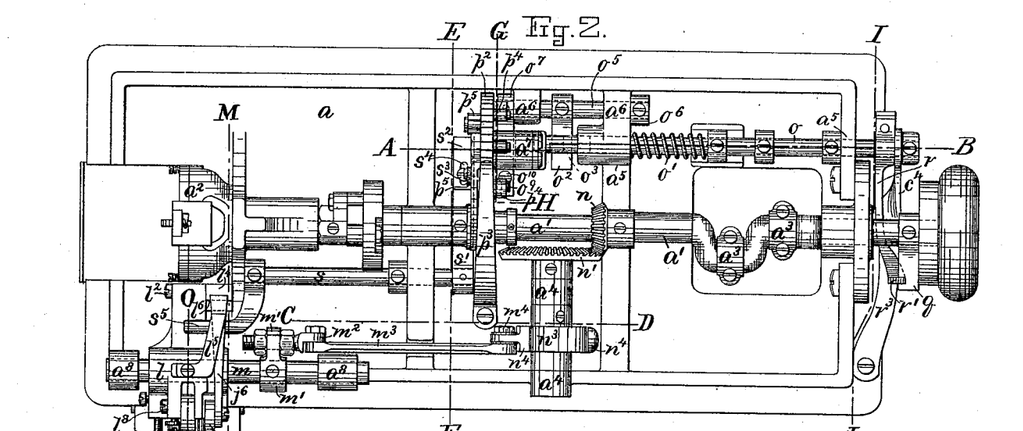
Fig. 2 represents a bottom view of the machine removed from its supporting-stand.
Figures 3, 4, 5:
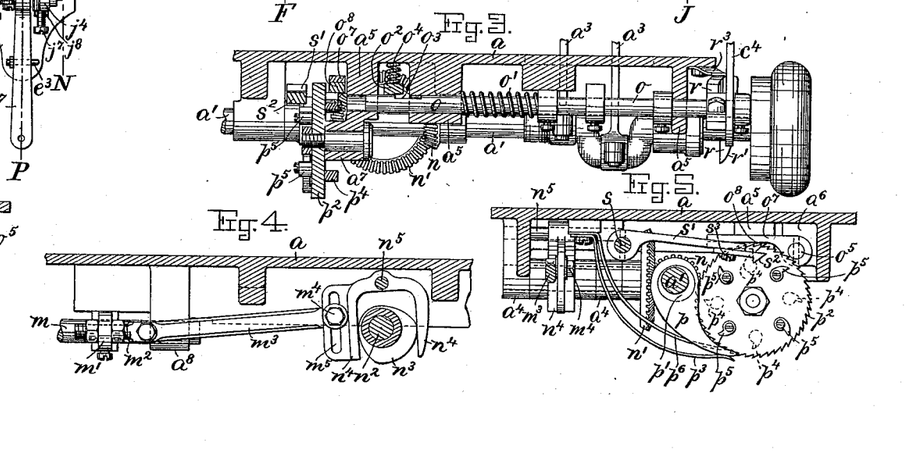
Fig. 3 represents a vertical longitudinal section on the line A B, shown on Fig. 2.
Fig. 4 represents a vertical longitudinal section on the line C D, shown on Fig. 2.
Fig. 5 represents a vertical cross-section on the line E F, shown on Fig. 2.
Figure 6:
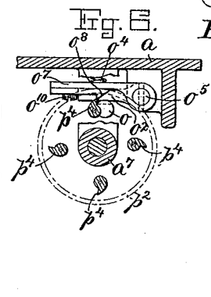
Fig. 6 represents a vertical cross-section on the line G H, shown on Fig. 2.

In order to automatically stop the machine after it has performed the work of sewing on a button and has made the desired number of stitches, I mount a shaft $o$ in bearings $a^5$ $a^5$ on the under side of the bed-plate, which shaft is moved longitudinally within said bearings against the influence of a spring $o'$ by means of the lever $c'$ pressing against the end of said shaft when said lever is operated to start the machine, as before described. When the shaft $o$ is pressed inward by the lever, as above described, it is caught and held in that position by means of a pawl or latch $o^2$, which is pressed into a notch $o^3$ on the shaft, as shown in Fig. 3, by means of a spring $o^4$. This pawl or latch is rigidly attached to a shaft $o^5$, mounted in bearings $a^6$ $a^6$ on the under side of the bed-plate, which shaft is kept from longitudinal movement in its bearings by means of a collar $o^6$ and a second pawl $o^7$, both firmly attached to said shaft. The pawl $o^7$ is provided with an inclined tooth $o^8$, which is made adjustable thereon by means of a slot $o^9$ and set-screw $o^{10}$. A pawl $p$, mounted upon an eccentric $p'$ on the shuttle-driving shaft, acts upon a ratchet-wheel $p^2$, adapted to rotate in a bearing $a^7$ on the bed-plate. This pawl is held against the teeth of the ratchet-wheel with a yielding pressure by means of a spring $p^3$, and it moves the ratchet-wheel one or more teeth, as required, for every revolution of the shuttle-driving shaft or for every stitch formed by the machine. A detent $p^6$ prevents the ratchet-wheel from revolving while the pawl is drawn backward on the ratchet-wheel. The ratchet-wheel $p^2$ is provided with side lugs or projections $p^4 p^4$ $p^4$, which come into contact with the inclined tooth $o^8$ on the pawl $o^7$ and cause it to raise said pawl when the machine has formed a sufficient number of stitches to sew the button to the material. The raising of the pawl rocks the shaft $o^5$, to which it is attached, which in turn raises the pawl or latch $o^2$ from the notch $o^3$ and liberates the shaft, allowing it to be pressed outward by means of the spring $o'$. This outward movement of the shaft causes the lever $c^4$, against which it rests, to turn on its fulcrum and to withdraw the projection $b^7$ on the face of the driving-pulley from contact with the arm $b^8$ on the driving-shaft and stops the conveyance of any further motion to the machine from the driving-pulley. The momentum of the moving parts, however, causes the shuttle-driving shaft to continue its motion until an arm $q$, firmly attached thereto, rides upon the incline $r'$ and enters the notch $r^2$ on the arm $r$, which is firmly mounted on the shaft $o$ and is brought into the path of the arm $q$, revolving with the shuttle-driving shaft, by the outward movement of the shaft $o$. This causes the machine to be locked with the needle at its upper position, preventing the shaft from rotating sufficiently to carry the needle downward into the work. The blow of the arm $q$ against the arm $r$ is cushioned by means of the spring $r^3$, which presses against the arm, and therefore prevents undue strain on the machine.

To automatically release the pawl $j^6$ from contact with the ledge $l^6$ and to allow the button-clamping jaws to be moved forward by the influence of the spring $l^3$ in order to form stitches through the remaining two eyes of the button after stitches have been formed in two of the eyes, I provide the ratchet-wheel $p^2$ with the side projections $p^5$ $p^5$ $p^5$, which are adapted to come into contact with an inclined tooth $s^2$, adjustably mounted upon the pawl $s'$ by means of the set-screw $s^3$ and the slot $s^4$, and to raise the end of said pawl, which is rigidly attached to the rock-shaft $s$, mounted in bearings on the under side of the bed-plate. To the rock-shaft $s$ is firmly attached the finger $s^5$, which moves downward as the shaft is moved by the upward movement of the pawl $s'$ and presses against the upper side of the pawl $j^6$, forcing it from the ledge $l^6$ and allowing the spring $l^3$ to move the button-holding jaws forward.

The tension-disks $t\,t$ are mounted on a hollow tubular stud $t'$, projecting from the face-plate of the machine, and are pressed together by means of the spring $t^2$, as usual. These disks exert the desired amount of tension on the upper thread, which passes between them, to properly set the stitches. The stud $t'$ is screw-threaded and provided with a nut $t^3$, which is adjustable on the stud to regulate the pressure between the disks, as usual. A washer $t^4$ is placed upon the stud between the spring and the outer tension-disk, said washer being provided with a bar which plays within a slot extending longitudinally from the outer end of the stud. The forward end of a rod $u$, adapted to move longitudinally within bearings $b^9\,b^9$ on the bracket-arm, enters the tubular stud. The opposite end of said rod is provided with an arm $u'$, which comes into contact with the upper end of the lever $c^4$ or a screw thereon when said lever operates the driving-pulley in stopping the machine and presses said rod forward against the influence of a spring $u^2$ on said rod, causing the forward end of the rod to press against the bar of the washer $b^4$, and thereby removes the pressure of the spring $t^2$ from the tension-disk $t$. This releases the tension from the upper thread and allows it to be drawn forward when the work is removed from the machine after sewing on a button.

If it is desired to adjust the machine so as to sew on buttons having two eyes only, the rod $e^3$ and chain $l^{10}$ are disconnected from the lever $l^7$, and said rod and chain are then connected together, (or said chain may be connected directly with the plate $e$,) so that a downward pull on the chain will turn the plate upon its fulcrum and raise the jaws $d\,d$ from the cloth-plate to place the work upon the cloth-plate or to insert the button in the clamping or holding jaws, but will not shift the button-holding device backward, as is necessary when the machine is used to sew buttons having four eyes. This changing of the machine from one to sew four-eyed buttons to one to sew two-eyed buttons, or vice versa, is accomplished very quickly and simply, so that articles having both two and four eyed buttons to be sewed thereon may be finished by one handling instead of first sewing on one set of buttons to all the articles and then re-handling them to sew on the second set, as is the case with machines now in common use.

The operation of the machine is as follows: After adjusting the holding-jaws to the size of button used they are raised from the bed-plate, as described. The material to which the button is to be attached is then placed in position on the cloth-plate and a button inserted in the jaws. The holding-jaws are then allowed to descend upon the material, holding the button in the position it is to occupy on the material when attached, with the needle directly over one of the front eyes of the button. The machine is then ready to be started, and the operator starts it by moving the driving-pulley on the driving-shaft, at the same time setting the starting mechanism, as above described. The machine then forms stitches in the two front eyes of the button by the reciprocation of the holding device between each rise and fall of the needle-bar, and continues to do so until one of the projections $p^5$ on the ratchet-wheel trips the pawl $j^6$ and allows the button-holding device to move forward, so as to bring the two rear eyes into position. The holding device is again intermittingly reciprocated under the needle-bar and stitches are formed in the rear eyes of the buttton until one of the projections $p^4$ on the ratchet-wheel raises the latch $o^2$ from the notch $o^3$ and allows the shaft $o$ to stop and lock the machine, as above described. The button-holding device is then raised and the material with the button attached is removed, the thread being drawn forward freely on account of the tension being automatically released when the machine is stopped, as described. When the button-holding device is raised to remove the work, it is shifted backward and locked by means of the pawl $j^6$, as above described.

Having thus fully described the nature, construction, and operation of my invention, I wish to secure by Letters Patent and claim—

1. In a machine for sewing on buttons, the combination with the vertically-reciprocating needle and complemental stitch-forming mechanism, of a button holder and carrier supported above the bed-plate and confined to movement in rectilinear lines, and intermittingly-operating means acting upon said holder and carrier to reciprocate the same in a right line during a predetermined number of stitches, then to shift said holder and carrier a predetermined distance in a line at a right angle to said right line, and then to again reciprocate said holder and carrier in a right line parallel to the former right line.

2. In combination with the stitch-forming mechanism of a sewing-machine, a button-holding device, a bracket to which said device is pivoted, a block or carriage journaled to the bed-plate said bracket being movable toward and from the needle-bar on said block or carriage, a spring to automatically force said bracket in one direction, a lever to force it in the other direction, a pawl to lock said bracket against the influence of said spring, and mechanism for releasing said pawl to allow said spring to operate said bracket, for the purpose set forth.

3. In combination with the stitch-forming mechanism of a sewing-machine, a button-holding device, a forward-and-backward-movable bracket supporting said device, a spring to force said bracket in one direction, a lever to operate it in the other direction, and a pawl to lock it in the latter direction, of mechanism for adjusting said pawl to adjust the amount of the movement of said bracket against said spring in order to lock it, for the purpose set forth.

4. In combination with the stitch-forming mechanism of a sewing-machine, a spring-pressed button-holding device, a bracket to which said device is pivoted, a block or carriage journaled to the bed-plate of the machine and on which said bracket is movable forward and backward, a spring to force said bracket forward, a pawl to lock said bracket backward and a lever and connections whereby said bracket is first moved backward sufficient to lock it by said pawl, and then said button-holding device is turned on its pivot to raise said device from the bed-plate, for the purpose set forth.

5. An up-and-down-movable needle-bar, a button-holding device, a bracket to which the device is pivoted, a block or carriage on which the bracket is movable toward or from the needle-bar, and a spring to force the bracket toward the needle-bar, combined with an adjustment to limit the forward movement of the bracket, for the purpose set forth.

6. An up-and-down-movable needle-bar combined with a button-holding device, a bracket to which the device is pivoted, a block or carriage on which the bracket is movable toward or from the needle-bar, mechanism for intermittingly reciprocating the block or carriage at right angles to the forward-and-back movement of the bracket, a spring to move the bracket toward the needle-bar, a lever to move it from the needle-bar, a pawl to lock the bracket backward against the influence of the spring, and mechanism to automatically release the pawl and allow the bracket to move forward, for the purpose set forth.

7. In a button-sewing machine, the combination with a button-holding device, a block or carriage capable of reciprocation and connections between the button-holding device and block or carriage whereby the button-holding device moves with the block or carriage, of the shaft $n^2$, the cam $n^3$ mounted upon and driven by said shaft, the bifurcated lever $n^4$ fulcrumed to the machine, embracing said cam and intermittingly rocked upon its fulcrum thereby, and the connecting-rod $m^3$ attached at one end to the bifurcated lever and at the other end adjustably connected to the block or carriage whereby the block or carriage and its connected button-holding device are intermittingly reciprocated and the button-holding device is adjustable in relation to the needle-bar of the sewing-machine, for the purpose set forth.

8. In a button-sewing machine, the combination with an intermittingly-reciprocating button-holder, a spring to press the holder in one direction at a right angle to its line of reciprocation, mechanism for moving said holder at right angles to the line of reciprocation and for locking it in its shifted position against the influence of said spring, of a ratchet-wheel, mechanism to operate said wheel, side projections on said wheel, a finger mounted on a shaft and resting against the locking device of the button-holder, and mechanism whereby said finger is operated by the projections on the ratchet-wheel to unlock the button-holder and allow it to be moved by the pressure exerted thereon, for the purpose set forth.

9. In a button-sewing machine, the combination with an intermittingly-reciprocated button-holder, a spring to press the holder in one direction at a right angle to its line of reciprocation, mechanism for moving said holder at right angles to the line of reciprocation and for locking it in its shifted position against the influence of said spring, of a ratchet-wheel, mechanism to operate said wheel, side projections on said wheel, a finger mounted on a shaft, and resting against the locking device of the button-holder, a pawl mounted on the shaft with said finger, and a tooth adjustably mounted on said pawl, adapted to come into contact with the projections on the ratchet-wheel and to operate said finger to unlock the button-holder and allow it to be moved by the pressure exerted thereon, for the purpose set forth.

10. In a button-sewing machine, the combination, with a driving-shaft, a driving-pulley and a lever fulcrumed to the machine and operated to cause the driving-pulley to be moved to either impart motion to the driving-shaft or to rotate freely without imparting motion, of the spring-pressed shaft $o$ moved longitudinally in its bearings against the influence of said spring-pressure by said lever when moving the driving-pulley to start the machine, the rock-shaft $o^5$, the latch $o^2$ on the rock-shaft to lock the shaft $o$ against the influence of the spring, the pawl $o^7$ on the rock-shaft, the ratchet-wheel $p^2$, mechanism between the driving-shaft and the ratchet-wheel to impart an intermittent rotation to the ratchet-wheel from the driving-shaft, lugs or projections $p^4$ on the ratchet-wheel to engage said pawl to cause said latch to release the shaft $o$, and thereby to allow said shaft to be moved longitudinally by the spring-pressure to automatically stop the machine and the tooth $o^8$ adjustably attached to said pawl whereby the time of stopping the machine is adjusted, as set forth.

11. In a button-sewing machine, the driving-shaft, the spring-pressed non-rotatable longitudinally-movable shaft $o$ moved longitudinally against the influence of the spring-pressure when starting the machine, the rock-shaft $o^5$, the locking-latch $o^2$ on the rock-shaft to lock the shaft $o$ as described, the pawl $o^7$ on the rock-shaft the eccentric $p'$ on the driving-shaft, the pawl $p$ mounted upon and operated by the eccentric, the ratchet-wheel $p^2$ intermittingly rotated by the pawl, and the projections $p^4$ to operate on the pawl to automatically release the shaft $o$ to stop the machine as described, combined with the arm $q$ rigidly mounted on the driving-shaft, and the inclined and notched locking-arm $r$ rigidly mounted on the shaft $o$ brought into the plane of the rotation of the arm $q$ by the stopping of the machine to automatically stop and lock the driving-shaft in any desired and predetermined position, for the purpose set forth.

12. In a button-sewing machine, the driving-shaft, the spring-pressed, non-rotatable longitudinally-movable shaft $o$ moved longitudinally against the influence of the spring-pressure when starting the machine, the rock-shaft $o^5$, the locking-latch $o^2$ on the rock-shaft to lock the shaft $o$ as described, the pawl $o^7$ on the rock-shaft, the eccentric $p'$ on the driving-shaft, the pawl $p$ mounted upon and operated by the eccentric, the ratchet-wheel $p^2$ intermittingly rotated by the pawl, and the projections $p^4$ to operate on the pawl to automatically release the shaft $o$ to stop the machine as described, combined with the arm $q$ rigidly mounted on the driving-shaft, and the inclined and notched locking-arm $r$ rigidly mounted on the shaft $o$ brought into the plane of the rotation of the arm $q$ by the stopping of the machine to automatically stop and lock the driving-shaft in any desired and predetermined position, and the spring $r^3$ pressing against the arm $r$ to provide a yielding cushion for said arm to prevent breakage, substantially as set forth.

13. In a button-sewing machine, the driving-shaft $a'$ the eccentric $p'$ firmly mounted upon and rotated by the shaft, the pawl $p$ mounted upon and operated by the eccentric, the ratchet-wheel $p^2$ intermittingly rotated by the pawl, and lugs or projections $p^4$ and $p^5$ on the ratchet-wheel combined with the pawl $o^7$ acted upon by the lugs or projections $p^4$, a lever fulcrumed to the machine, mechanism whereby the operations of said lever cause the starting or stopping of the machine, connecting mechanism between the pawl $o^7$ and the lever whereby said lever is operated to automatically stop the machine by the projections $p^4$ acting upon the pawl $o^7$, the pawl $s'$ acted upon by the lugs or projections $p^5$, a spring-pressed button-holder, a locking device to lock the button-holder against the spring-pressure, and connecting mechanism between the pawl $s'$ and the locking device whereby the button-holder is automatically unlocked by the projections $p^5$ acting upon the pawl $s'$, and the button-holder moved by said spring-pressure, for the purpose set forth.

14. In a button-sewing machine, the supporting-plate $e$ the jaws $d$ pivoted at $d'$ to the plate to clamp and hold the button between their forward ends and the pins $d^2$ projecting from the opposite end of the jaws, combined with the cam-disk $f$ pivoted to the plate $e$, the cam-slots $f'$ in the cam-disk to receive the pins $d^2$, the adjusting-screw $h$ upon the supporting-plate, and the nut $g$ adjustable upon said screw and engaging the cam-disk to rotate the same, thereby spreading or contracting the space between the forward ends of the jaws for buttons of various sizes, as set forth.

15. In a button-sewing machine, the supporting-plate $e$ the jaws $d$ pivoted at $d'$ to the plate to clamp and hold the button between their forward ends, the pins $d^2$ projecting from the opposite ends of the jaws, the cam-disk $f$ pivoted to the plate $e$ the cam-slots $f'$ in the cam-disk to receive the pins $d^2$ the adjusting-screw $h$ upon the supporting-plate, and the nut $g$ adjustable upon said screw and engaging the cam-disk to rotate the same, thereby spreading the forward ends of the jaws apart to use larger buttons, combined with the spring $d^3$acting upon the forward ends of the jaws to contract the space between them holding the pins $d^2$ against the outer surface of the slots $f'$ and allowing the jaws to yield slightly to compensate for slight variations in the size of different buttons, as set forth.

16. In a button-sewing machine a supporting-plate, two button-holding jaws pivoted to the plate adapted to receive the button between the outer ends of the jaws and provided with projecting pins at their opposite end, a gage provided with a projecting pin at its inner end mounted in bearings on the supporting-plate and movable in and out in its bearings, combined with a cam pivoted to the supporting-plate, having cam-surfaces to engage the projecting pins on the holding-jaws to adjust said jaws for various sizes of buttons, said cam also having a cam-surface to engage the projecting pin on the gage to adjust the gage to cause the centers of all buttons held in the jaws to occupy the same position, no matter how they may vary in size, for the purpose set forth.

17. In a button-sewing machine, a stitch-forming mechanism an intermittingly-reciprocated carriage, a bracket carried by and reciprocated with said carriage movable on the carriage at a right angle to the line of its reciprocation, a plate pivoted to the bracket, button-holding jaws mounted on the plate, a spring to move the bracket automatically in one direction, a pawl to lock it in the opposite direction against the influence of the spring, a lever pivoted to the carriage to operate on the bracket, to move said bracket and cause it to be locked against the influence of the spring, and a rod between the bracket-operating lever and the plate for carrying the button-holding jaws, whereby the operation of said lever will first cause the bracket to be moved and locked against the influence of the spring, and then cause the plate to turn upon its pivot to raise the jaws in order to receive the button, for the purpose set forth.

In testimony whereof I have hereunto set my hand, in the presence of two subscribing witnesses, this 24th day of February, A. D. 1892.

FRANK A. WING.

In presence of—
 VIOLA H. RAE,
 HENRY CHADBOURN.